United States Patent [19]

Hamada et al.

[11] 4,371,487

[45] Feb. 1, 1983

[54] PROCESS FOR THE PRODUCTION OF A HOLLOW FIBER SEMIPERMEABLE MEMBRANE

[75] Inventors: Kaduto Hamada; Zitumi Takata; Katuhisa Numata, all of Otsu, Japan

[73] Assignee: Toyoboseki Kabushiki Kaisha, Osaka, Japan

[21] Appl. No.: 89,676

[22] Filed: Oct. 30, 1979

[30] Foreign Application Priority Data

Feb. 11, 1978 [JP] Japan ................................., 53/135494

[51] Int. Cl.$^3$ .............................................. B29D 27/00
[52] U.S. Cl. ................................... 264/49; 210/500.2; 264/561; 264/203; 264/209.1; 428/398
[58] Field of Search ................ 264/177 Z, 203, 209.1, 264/49, 207, 200, 41; 428/398; 106/176, 196; 210/500.2

[56] References Cited

U.S. PATENT DOCUMENTS

| 3,175,339 | 3/1965 | McDowell | 425/67 |
|---|---|---|---|
| 3,412,184 | 11/1968 | Sharples et al. | 264/49 |
| 3,432,584 | 3/1969 | Cannon et al. | 264/49 |
| 3,536,658 | 10/1970 | Wich | 106/176 |
| 3,546,209 | 12/1970 | Lipps | 264/49 |
| 3,772,072 | 11/1973 | Brown et al. | 264/49 |
| 3,780,147 | 12/1973 | Stana | 264/49 |
| 3,784,393 | 1/1974 | Sonn et al. | 106/196 |
| 3,804,932 | 4/1974 | Ishii et al. | 264/49 |
| 3,846,404 | 11/1974 | Nichols | 106/196 |
| 3,873,653 | 3/1975 | Meinecke et al. | 264/233 |
| 3,883,626 | 5/1975 | Kamida et al. | 264/49 |
| 3,915,912 | 10/1975 | Ishikawa et al. | 264/211 |
| 4,026,978 | 5/1977 | Mungle et al. | 106/176 |
| 4,035,459 | 7/1977 | Kesting | 264/49 |
| 4,147,622 | 4/1979 | Nussbaumer | 210/500.2 |
| 4,157,960 | 6/1979 | Chang et al. | 210/500.2 |
| 4,171,987 | 10/1979 | Horiguchi et al. | 264/49 |
| 4,234,431 | 11/1980 | Mishiro et al. | 264/200 |

FOREIGN PATENT DOCUMENTS

| 1260681 | 2/1968 | Fed. Rep. of Germany | 264/207 |
|---|---|---|---|
| 45-20483 | 7/1970 | Japan . | |
| 50-32080 | 3/1975 | Japan | 210/500.2 |
| 50-34518 | 11/1975 | Japan | 210/500.2 |
| 52-77885 | 6/1977 | Japan | 210/500.2 |
| 54-15030 | 2/1979 | Japan | 264/177 Z |
| 54-88881 | 7/1979 | Japan . | |
| 54-88883 | 7/1979 | Japan . | |
| 478074 | 11/1975 | U.S.S.R. | 264/207 |

*Primary Examiner*—Jay H. Woo
*Attorney, Agent, or Firm*—Jones, Tullar & Cooper

[57] ABSTRACT

Process for production of a hollow fiber semipermeable membrane which can selectively separate the components of solution or gas mixtures, which consists essentiallly of dissolving cellulose triacetate and an organic acid and optionally a polyether in N-methyl-2-pyrrolidone to give a spinning solution having fixed contents of cellulose triacetate and organic acid and polyether (if any), and extruding the spinning solution through a spinneret into a gaseous atmosphere and immersing the spun fibers in an aqueous coagulation bath. The hollow fiber semipermeable membrane has excellent permeability and excellent separation characteristics with good life and hence is useful for various techniques such as dialysis, ultrafiltration, reverse osmosis, and separation of gases.

5 Claims, No Drawings

PROCESS FOR THE PRODUCTION OF A HOLLOW FIBER SEMIPERMEABLE MEMBRANE

The present invention relates to a process for the production of a hollow fiber semipermeable membrane which can selectively separate the components of a mixture in the form of solution or in the gaseous state. More particularly, it relates to a process for the production of a high-performance hollow fiber semipermeable membrane comprising cellulose triacetate.

In order to separate the components contained in fluid, a semipermeable membrane having a selective permeability is widely used in various techniques, such as dialysis, ultrafiltration, reverse osmosis, separation of gases, or the like. Particularly, reverse osmosis is observed as a new useful technique in various processes such as a process for obtaining fresh water from sea water or brackish water, a process for re-use of industrial waste water. In such separation processes, a semipermeable membrane having high performance is required in order to do the desired separation with high efficiency on an industrial scale. Although various materials suitable for the preparation of the semipermeable membranes have been proposed, cellulose esters, particularly cellulose acetate, are the most useful in view of the ease of forming into membranes, the characteristics of the membranes, cost, and the like. The membrane made from cellulose diacetate, however, is inferior in hydrolytic resistance, resistance to decomposition with microorganisms, mechanical properties, or the like, and hence, development of an improved cellulose acetate membrane having a long life has been required. For instance, when waste water is treated with a membrane having a short life, the membrane should repeatedly be changed within a very short period of time, which results in a high cost. It is known that the abovementioned drawbacks of cellulose acetate per se may be eliminated by using cellulose triacetate. However, when cellulose triacetate is used for the preparation of a membrane, the permeability of the membrane is significantly decreased, while the separation characteristics can be improved, and hence, the known membrane made from cellulose triacetate is not necessarily suitable from the practical viewpoint.

It is also proposed that the water permeability of cellulose triacetate membrane is improved by an appropriate means. For instance, it is reported that a semipermeable membrane having improved water permeability while keeping excellent salt rejection can be prepared by adding additives such as metal salts, inorganic acids, carboxylic acids, alcohols, organic amines or the like to a solution of cellulose triacetate, and forming the resulting dope into a filmy membrane. However, according to this method, a large amount of additives is required in order to improve the water permeability sufficiently. When a large amount of additives is added to the dope for forming a membrane, it is impossible to obtain a hollow fiber membrane which is continuously hollow and has a uniform membrane thickness, even though a sheet membrane may be obtainable. Besides, the method has a drawback of significantly decreased salt rejection which acccompanies the improvement of the water permeability.

Accordingly, in order to obtain an improved hollow fiber membrane of cellulose triacetate which is superior in both salt rejection and permeability while having excellent durability, it is necessary to find a dope having different components from that of the dope for the preparation of a sheet membrane.

As a result of intensive study of the present inventors, it has been found that the desired hollow fiber semipermeable membrane can be prepared by preparing a spinning solution of a specific amount of cellulose triacetate and an organic acid in N-methyl-2-pyrrolidone and spinning the solution to form the hollow fiber membrane.

An object of the present invention is to provide an improved semipermeable membrane suitable for selective separation of components of solution or gas mixtures. Another object of the invention is to provide an improvement of performance of a cellulose triacetate membrane. These and other objects and advantages of the present invention will be apparent to those skilled in the art by the following description.

The semipermeable hollow fiber membrane of cellulose triacetate of the present invention can be prepared by dissolving cellulose triacetate and an organic acid in N-methyl-2-pyrrolidone to prepare a spinning solution having a content of cellulose triacetate of 30 to 60% by weight and a content of the organic acid of 0.02 to 3.0% by weight based on the whole weight of the solution, extruding the resultant spinning solution into a gaseous atmosphere through a spinneret, and immersing the spun fibers into an aqueous coagulation bath.

The present invention is characteristic in that N-N-methyl-2-pyrrolidone is used as a solvent for cellulose triacetate and an organic acid is used therewith as an additive, and thereby, there can be obtained the desired hollow fiber membrane, having high performance, which can not be achieved by the conventional semipermeable hollow fiber membrane. That is, the semipermeable hollow fiber membrane of the present invention has a highly selective permeability, for instance, almost 100% rejection of inorganic salts, and also an extremely high permeability while keeping the excellent salt rejection. Moreover, the membrane of the present invention has an excellent life and can keep its high salt rejection and high permeability for a long period of time.

The semipermeable hollow fiber membrane of the preset invention is useful for various selective separation processes such as dialysis, ultrafiltration, reverse osmosis, separation of gases, or the like. Particularly, when it is used for reverse osmosis, it shows a remarkably excellent membrane performance. For instance, when the membrane of the present invention is used for making fresh water from sea water, the desired fresh water can be obtained by only one stage treatment because of the membrane's high salt rejection, though conventional membranes require two stage treatment in order to obtain fresh water from sea water.

The organic acid used in the present invention includes monobasic acids, dibasic acids and tribasic acids which may be aliphatic acids and aromatic acids. Aromatic acids are preferable. Suitable organic acids are carboxylic acids having a hydrophilic substituent such as amino, hydroxy, alkoxy, nitrile, hydroxyalkyl ester groups. Particularly suitable organic acids are amino acids, aromatic carboxylic acids having 7 to 16 carbon atoms, hydroxy-substituted aromatic carboxylic acids having 7 to 16 carbon atoms, alkoxy-substituted aromatic carboxylic acids having 7 to 16 carbon atoms, dibasic acids or their hydroxymonoesters. Suitable examples of the organic acids are 4-aminobutyric acid, 4-(methylamino)butyric acid, ε-amino-n-caproic acid, aspartic acid, benzoic acid, m- or p-hydroxybenzoic acid, m- or p-aminobenzoic acid, anisic acid, phthalic acid, toluic acid, anthranilic acid, salicyclic acid, a halogenated benzoic acid (e.g. o-, m- or p-chlorobenzoic acid), phthalic acid hydroxyethyl monoester, oxalic acid, malonic acid, tartaric acid, or the like, which may be used alone or in combinations of two or more thereof.

The organic acids are used in an amount of 0.02 to 3.0% by weight, preferably 0.02 to 2.0% by weight, based on the whole weight of the spinning solution. When the organic acids are used in an amount of less than 0.02% by weight, no effect of addition is observed, and the membrane obtained shows a low salt rejection and a low permeability. On the other hand, when the amount of the organic acid is over 3.0% by weight, the permeability of the membrane is no more improved, and it becomes rather difficult to obtain a uniform hollow fiber membrane and further the membrane shows a lower salt rejection.

The desired hollow fiber membrane is prepared in the following manner.

An organic acid is dissolved in N-methyl-2-pyrrolidone and therein is further uniformly dissolved cellulose triacetate to give a spinning solution. The preparation method of the spinning solution is not restricted to the above method, but may be done by any other conventional method. The spinning solution thus prepared has a content of cellulose triacetate of 30 to 60% by weight based on the whole weight of the solution. When the content of cellulose triacetate is less than 30% by weight, the hollow fiber membrane has low separation characteristics and low membrane strength, and on the other hand, when the content is over 60% by weight, the spinning solution has too high a viscosity and hence it must be spun at a high temperature, which results in significant decrease of the permeability of the hollow fiber membrane.

The spinning solution this prepared is heated to 90° to 190° C. and extruded through an arc type, C type or tube-in-orifice type spinneret. The extruded (spun) hollow fibers are passed through a gaseous atmosphere (e.g. air optionally including vapor of N-methyl-2-pyrrolidone) for 0.02 to 0.4 second and subsequently are immersed in an aqueous coagulation bath (e.g. water, an aqueous solution of N-methyl-2-pyrrolidone) for an appropriate period of time. Thereafter, the remaining solvent and additives (if any) are preferably removed by washing with water. The hollow fibers thus obtained are preferably subjected to heat treatment at 60° to 120° C. in order to give them the desired excellent properties.

In the above method, it is further preferable to add a polyether to the spinning solution in order to control the structure of the hollow fiber membrane. That is, in a preferred embodiment, cellulose triacetate and an organic acid are dissolved in N-methyl-2-pyrrolidone and thereto is added a polyether to give a spinning solution which has a content of cellulose triacetate of 30 to 60% by weight and a content of the organic acid of 0.02 to 3.0% by weight and further has a ratio of N-methyl-2-pyrrolidone and the polyether of 85:15 to 50:50 by weight, and the spinning solution thus obtained is extruded into a gaseous atmosphere and then is immersed in an aqueous coagulation bath.

The polyether used in the present invention corresponds to the formula:

$$R_1O(C_2H_4O)_nR_2$$

wherein $R_1$ and $R_2$ are each hydrogen, a hydrocarbon group having 1 to 6 carbon atoms, $-C_2H_4R'$ or $-COR''$, $R'$ is $-CN$, $-COR'''$, $-CONH_2$ or $-CH_2NH_2$, $R''$ and $R'''$ are each hydrogen or a hydrocarbon group having 1 to 6 carbon atoms, and n is an integer of 1 to 6. Suitable examples of the polyether are ethylene glyclol, diethylene glycol, triethylene glycol, tetraethylene glycol, a polyethylene glycol having a molecular weight of not larger than 300, methylcarbitol, dimethylcarbitol, methoxytriglycol, triethylene glycol monoethyl ether, methoxypolyethylene glycol, acetylated polyethylene glycol, cyanoethylated polyethylene glycol, aminoethylated polyethylene glycol, bisaminopropylated polyethylene glycol, polyethylene glycol β-carboxypropionate, or the like, which may be used alone or in combination of two or more thereof. The polyethers are used in an amount of 15 to 50% by weight based on the whole weight of the N-methyl-2-pyrrolidone and the polyether. The value of n of the above formula of the polyether is also has an affect on the membrane properties of the final product, and when the value of n is over 7, the membrane shows decreased separation characteristics.

The present invention is illustrated by the following Examples but is not limited thereto. In Examples, "part" means "part by weight" unless specified otherwise.

EXAMPLE 1

To a mixture of N-methyl-2-pyrrolidone (40 parts), ε-amino-n-caproic acid (0.5 part) and ethylene glycol (17.5 parts) is added cellulose triacetate (42 parts), and the mixture is dissolved with agitation under heating. The resulting spinning solution thus prepared is filtered, defoamed and heated at 160° C. and immediately extruded into air through an arc type spinneret. The spun fibers are passed through air for 0.04 second, immersed in a 25% by weight aqueous solution of N-methyl-2-pyrrolidone for 5 seconds, washed with water by Nelson roller system, and then wound up at a rate of 20 m/minute onto a hank device. The hollow fibers thus obtained are treated with a hot water of 95° C. for 10 minutes in the wound state without giving any tension thereto.

The hollow fibers thus obtained were made into a hank of filaments (length: 1 m, winding number: 100), and one end thereof was adhered with an epoxy resin. The hank of filaments thus obtained was charged into a stainless steel tubular pressure-proof vessel (inner diameter: 20 mm, length: 1 m) provided with an inlet for supplying water to be treated and an outlet of the treated water. Into the vessel was circulated a 0.2% aqueous solution of sodium chloride (NaCl) under a pressure of 30 kg/cm$^2$, and the flow rate of water permeated and the NaCl-rejection were measured. The results are shown in Table 1.

The NaCl-rejection and the compaction factor (m) are shown by the following formulae.

$$\text{NaCl-rejection (\%)} = \left(1 - \frac{\text{Concentration of permeated water}}{\text{Concentration of supplied water}}\right) \times 100$$

$$J_t = J_1 \cdot t^{-m}$$

wherein $J_t$ is a flow rate of permeated water after t hour, $J_1$ is a flow rate of permeated water after 1 hour, and t is an operation time.

EXAMPLES 2 to 7

In the same manner as described in Example 1, various hollow fiber membranes are prepared by using spinning solutions having various components as shown in Table 1.

The hollow fiber membranes thus obtained were subjected to the salt rejection test in the same manner as described in Example 1, wherein a 0.2% aqueous solution of sodium chloride was circulated under a pressure of 30 kg/cm², and the amount of permeated water and the NaCl-rejection were measured likewise. The results are shown in Table 1.

REFERENCE EXAMPLE 1

A hollow fiber membrane is prepared under the same conditions as in Example 7 except that dimethylsulfoxide is used instead of N-methyl-2-pyrrolidone.

The membrane was also subjected to the salt rejection test likewise. The results are also shown in Table 1.

REFERENCE EXAMPLES 2 to 3

Hollow fiber membranes are prepared under the same conditions as in Example 7 and Reference Example 1 except that ε-amino-n-caproic acid is used in an amount of 6.0% by weight and the solvent is used in an amount of 58.0% by weight.

The membranes were also subjected to the salt rejection test likewise. The results are also shown in Table 1.

What is claimed is:

1. A process for the production of a hollow fiber membrane, which comprises forming a spinning solution consisting essentially of cellulose triacetate and an organic acid in N-methyl-2-pyrrolidone having a cellulose triacetate content of 30 to 60% by weight and an organic acid content of 0.02 to 3.0% by weight based on the total weight of the spinning solution, extruding the spinning solution through a spinneret into a gaseous atmosphere, and immersing the resultant spun fiber in an aqueous coagulation bath.

2. A process according to claim 1, wherein the organic acid is a member selected from the group consisting of amino acids, aromatic carboxylic acids and hydroxycarboxylic acids.

3. A process according to claim 1, wherein the organic acid is a member selected from the group consisting of dibasic acids and their hydroxyalkyl monoesters.

4. A process according to claim 1, wherein a polyether of the formula: $R_1O(C_2H_4O)_nR_2$ wherein $R_1$ and $R_2$ are each hydrogen, a hydrocarbon group having 1 to 6 carbon atoms, -C$_2$H$_4$R' or -COR", R' is -CN, -COR''', -CONH$_2$ or -CH$_2$NH$_2$, R" and R''' are each hydrogen or a hydrocarbon group having 1 to 6 carbon atoms, and n is an integer of 1 to 6, is incorporated into the spinning solution in a weight ratio of the N-methyl-2-pyrrolidone and the polyether of 85:15 to 50:50.

5. A process according to claim 4, wherein the spinning solution is extruded through a spinneret into a gaseous atmosphere, and the resultant spun fiber is passed through the gaseous atmosphere for 0.02 to 0.4 second, and then immersed in an aqueous coagulation bath to form a membrane of hollow fiber.

* * * * *

TABLE 1

| | Components of spinning solution (% by weight) | | | | | Membrane characteristics | | |
|---|---|---|---|---|---|---|---|---|
| | | Solvent | | Organic acid | Polyether | Flow rate of permeated water | NaCl-rejection | Compaction factor |
| Ex. No. | CTA*¹ | Kind | Amount | (Amount) | (Amount) | (l/m² · day) | (%) | (m) |
| Ex. 1 | 42.0 | NMP*² | 57.0 | Benzoic acid (1.0) | — | 185 | 99.7 | — |
| Ex. 2 | 46.0 | " | 53.4 | 4-(Methylamino)-butyric acid (0.6) | — | 182 | 99.8 | 0.017 |
| Ex. 3 | 42.0 | " | 40.0 | ε-Amino-n-caproic acid (0.5) | Ethylene glycol (17.5) | 210 | 99.8 | 0.016 |
| Ex. 4 | 43.0 | " | 35.8 | p-Hydroxybenzoic acid (0.2) | Triethylene glycol (21.0) | 220 | 99.8 | 0.021 |
| Ex. 5 | 54.0 | " | 29.0 | Maleic acid (0.8) | Methylcarbitol (16.2) | 215 | 99.8 | — |
| Ex. 6 | 39.0 | " | 40.0 | Benzoic acid (1.1) | Acetylated polyethylene glycol (n = 4) (19.9) | 225 | 99.7 | 0.018 |
| Ex. 7 | 36.0 | " | 63.0 | ε-Amino-n-caproic acid (1.0) | — | 193 | 99.7 | — |
| Ref. Ex. 1 | 36.0 | DMSO*³ | 63.0 | -Amino-n-carpoic acid (1.0) | — | 93 | 81.6 | — |
| Ref. Ex. 2 | 36.0 | NMP | 58.0 | -Amino-n-carpoic acid (6.0) | — | 198 | 91.0 | — |
| Ref. Ex. 3 | 36.0 | DMSO | 58.0 | -Amino-n-carpoic acid (6.0) | — | 165 | 62.2 | — |

[Remarks]:
*¹CTA: Cellulose triacetate,
*²NMP: N—Methyl-2-pyrrolidone,
*³DMSO: Dimethylsulfoxide.